(12) United States Patent
Hwang et al.

(10) Patent No.: US 11,610,695 B2
(45) Date of Patent: Mar. 21, 2023

(54) METHOD FOR DECOMMISSIONING NUCLEAR FACILITIES

(71) Applicant: KOREA HYDRO & NUCLEAR POWER CO., LTD., Gyeongju-si (KR)

(72) Inventors: Seok-Ju Hwang, Daejeon (KR); Hyun-Je Cho, Daejeon (KR); Ji-Hoon Lee, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 231 days.

(21) Appl. No.: 17/048,317

(22) PCT Filed: Apr. 18, 2019

(86) PCT No.: PCT/KR2019/004665
§ 371 (c)(1),
(2) Date: Oct. 16, 2020

(87) PCT Pub. No.: WO2019/203582
PCT Pub. Date: Oct. 24, 2019

(65) Prior Publication Data
US 2021/0158982 A1    May 27, 2021

(30) Foreign Application Priority Data
Apr. 19, 2018   (KR) .......................... 10-2018-0045649

(51) Int. Cl.
*G21D 1/00*   (2006.01)
*G21F 9/00*   (2006.01)

(52) U.S. Cl.
CPC ............. *G21D 1/003* (2013.01); *G21F 9/001* (2013.01)

(58) Field of Classification Search
None
See application file for complete search history.

(56) References Cited

U.S. PATENT DOCUMENTS

| | | |
|---|---|---|
| 2002/0195575 A1 | 12/2002 | Martin |
| 2011/0235768 A1 | 9/2011 | Heim et al. |
| 2016/0125963 A1 | 5/2016 | McDaniel |

FOREIGN PATENT DOCUMENTS

| | | | |
|---|---|---|---|
| JP | 64-66371 | 3/1989 | |
| JP | 04-158297 | 6/1992 | |
| JP | 4280921 | 6/2009 | |
| JP | 2012-230084 | 11/2012 | |
| JP | 2014-055824 | 3/2014 | |
| JP | 2015152387 | * 8/2015 | ............... G21F 9/30 |
| JP | 2017-067754 | 4/2017 | |

(Continued)

OTHER PUBLICATIONS

JP 2015152387 English translation, accessed on Aug. 2022. (Year: 2015).*

(Continued)

*Primary Examiner* — Eric W Golightly
*Assistant Examiner* — Arlyn I Rivera-Cordero
(74) *Attorney, Agent, or Firm* — Lex IP Meister, PLLC (57) ABSTRACT

A method for decommissioning a nuclear facility includes: separating a nuclear reactor pressure vessel from biodegradable concrete; decommissioning a concrete structure; covering the biodegradable concrete; and decommissioning the biodegradable concrete.

4 Claims, 7 Drawing Sheets

(56) References Cited

FOREIGN PATENT DOCUMENTS

| | | |
|---|---|---|
| KR | 1024039 | 3/2011 |
| KR | 10-1662588 | 10/2016 |

OTHER PUBLICATIONS

JP2012230084 English translation, accessed on Aug. 2022. (Year: 2012).*

JP2017067754 English translation, accessed on Aug. 2022. (Year: 2017).*

JP201455824 English translation, accessed on Aug. 2022. (Year: 2014).*

EPO, Search Report of EP 19788648.4 dated Jan. 5, 2022, 8 pages.

* cited by examiner

METHOD FOR DECOMMISSIONING NUCLEAR FACILITIES

CROSS-REFERENCE TO RELATED APPLICATION

This application is a National Stage Application of PCT International Patent Application No. PCT/KR2019/004665 filed on Apr. 18, 2019, under 35 U.S.C. § 371, which claims priority to Korean Patent Application No. 10-2018-0045649 filed on Apr. 19, 2018, which are all hereby incorporated by reference in their entirety.

TECHNICAL FIELD

The present disclosure relates to a method for decommissioning nuclear facilities.

BACKGROUND ART

In general, a nuclear power plant in a pressurized water reactor type from among nuclear facilities used for nuclear power generation includes a nuclear reactor pressure vessel, biodegradable concrete for supporting the nuclear reactor pressure vessel, surrounding facilities such as a steam generator connected to the nuclear reactor pressure vessel, and a concrete structure neighboring the biodegradable concrete and supporting the surrounding facilities.

When the nuclear facilities are decommissioned, because the biodegradable concrete for supporting the nuclear reactor pressure vessel is radioactivated, when the biodegradable concrete is decommissioned, a non-radioactivated concrete structure neighboring the biodegradable concrete is contaminated.

The above information disclosed in this Background section is only for enhancement of understanding of the background of the invention, and therefore it may contain information that does not form the prior art that is already known in this country to a person of ordinary skill in the art.

DISCLOSURE

The present invention has been made in an effort to provide a method for decommissioning a nuclear facility for suppressing contamination of a peripheral area when biodegradable concrete is decommissioned.

The present invention has been made in another effort to provide a method for decommissioning a nuclear facility with a minimized decommissioning time.

An exemplary embodiment of the present invention provides a method for decommissioning a nuclear facility including a nuclear reactor pressure vessel, a biodegradable concrete surrounding the nuclear reactor pressure vessel, and a concrete structure separated from the nuclear reactor pressure vessel and neighboring the biodegradable concrete, including: separating the nuclear reactor pressure vessel from the biodegradable concrete; decommissioning the concrete structure; covering the biodegradable concrete; and decommissioning the biodegradable concrete.

The nuclear facility may further include a containment vessel for containing the nuclear reactor pressure vessel, the biodegradable concrete, and the concrete structure, and the concrete structure may be decommissioned and the biodegradable concrete may be decommissioned in the containment vessel.

The concrete structure may include a first concrete layer, a first floor, a second concrete layer, a second floor, a third concrete layer, a third floor, and a fourth concrete layer that are sequentially stacked.

The decommissioning of the concrete structure may include: decommissioning the fourth concrete layer; decommissioning the third floor and the third concrete layer; decommissioning the second floor and the second concrete layer; and decommissioning the first floor and the first concrete layer.

The covering of the biodegradable concrete may be performed by closing and sealing the biodegradable concrete with a packing container.

The decommissioning of the biodegradable concrete may be performed by suctioning internal air from the packing container.

The nuclear reactor pressure vessel may be of a pressurized water reactor type.

According to the exemplary embodiment, the method for decommissioning a nuclear facility for suppressing contamination of surroundings when biodegradable concrete is decommissioned is provided.

Further, the method for decommissioning a nuclear facility with the minimized decommissioning time is provided.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Unless explicitly described to the contrary, the word "comprise" and variations such as "comprises" or "comprising" will be understood to imply the inclusion of stated elements but not the exclusion of any other elements.

A method for decommissioning a nuclear facility according to an exemplary embodiment will now be described with reference to FIG. 1 to FIG. 7.

Hereinafter, a pressurized water reactor (PWR) type of nuclear power plant will be exemplified as the nuclear facility, and without being limited to this, the nuclear facility may be a boiling water reactor (BWR) type of nuclear power plant.

The pressurized water reactor type of nuclear power plant uses light water as a coolant and a moderator, and uranium 235 is compressed by about 2% to 4% and is used as a nuclear fuel.

The pressurized water reactor type of nuclear power plant may be distinguished into a facility relating to a nuclear reactor system for transmitting heat generated by nuclear fission in the nuclear reactor to a steam generator and exchanging heat, and a facility relating to a turbine and generator system for running the turbine with the steam generated by a steam generator, allowing it to pass through a condenser, reducing it into water, and circulating it to the steam generator.

In general, a coolant (or light water) that is a heat transmitting medium of the nuclear reactor system is heated up to about 320° C. by the nuclear reactor, and is pressurized with about 153 atmospheres so that it may not be boiled.

Devices configuring the system include a pressurizer for adjusting the pressure to maintain enthalpy, and a coolant pump for circulating the coolant between the nuclear reactor and the steam generator.

The system for the steam generated by the steam generator to run the turbine and produce power from the generator connected to the turbine shaft may correspond to the principle of general thermoelectric power plants.

Figure 1:
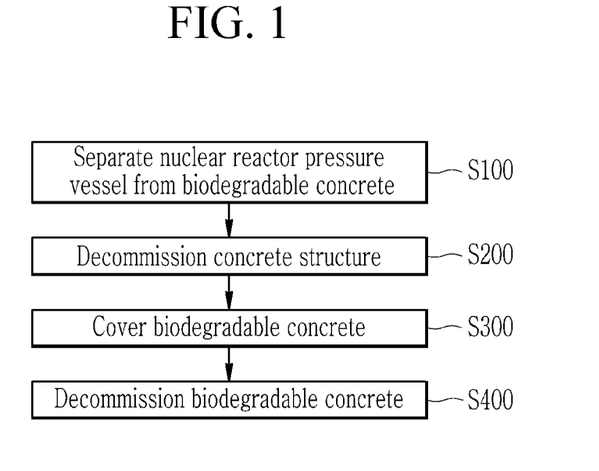
FIG. 1 shows a flowchart of a method for decommissioning a nuclear facility according to an exemplary embodiment.

FIG. 1 shows a flowchart of a method for decommissioning a nuclear facility according to an exemplary embodiment. FIG. 2 to FIG. 7 show a method for decommissioning a nuclear facility according to an exemplary embodiment.

Figure 2:
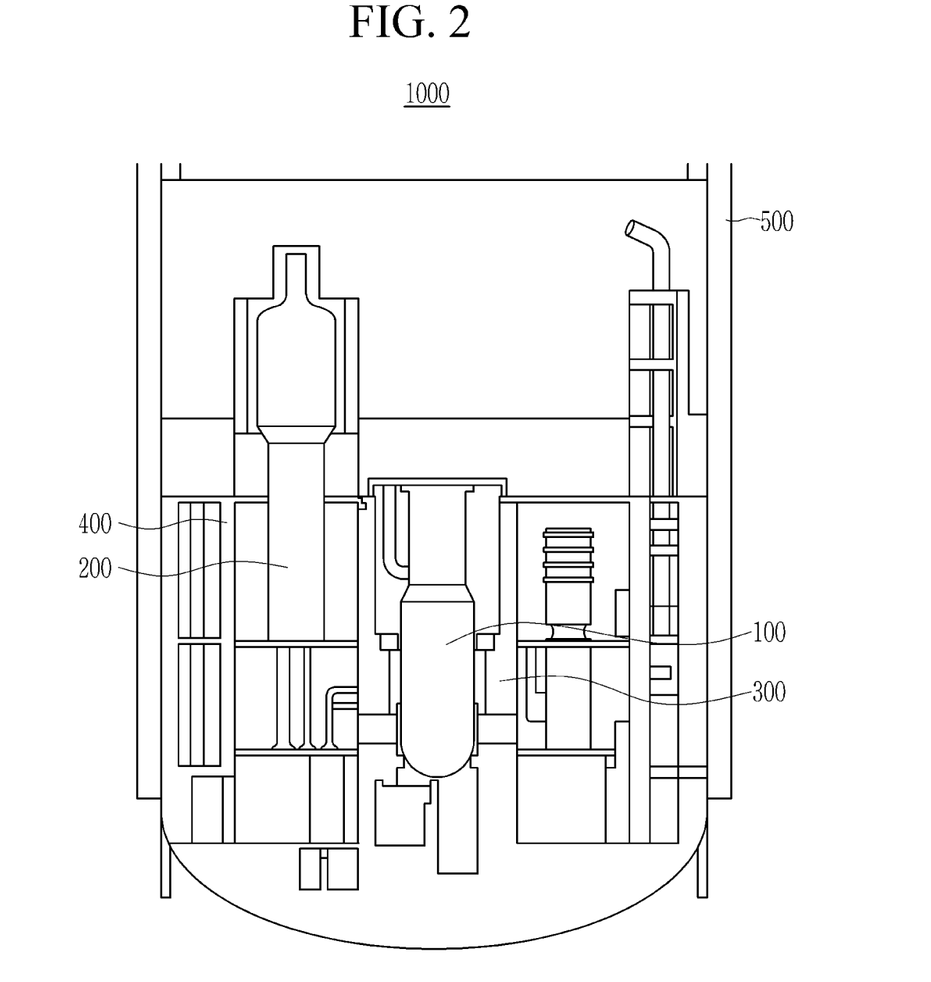
FIG. 2 to FIG. 7 show a method for decommissioning a nuclear facility according to an exemplary embodiment.

Referring to, FIG. 1 and FIG. 2, a nuclear reactor pressure vessel 100 is separated from biodegradable concrete 300 (S100).

FIG. 2 shows a nuclear facility.

In detail, referring to FIG. 2, the nuclear facility 1000 includes: a nuclear reactor pressure vessel 100; biodegradable concrete 300 for surrounding the nuclear reactor pressure vessel 100 and supporting the nuclear reactor pressure vessel 100; a surrounding facility 200, such as a steam generator, separated from the nuclear reactor pressure vessel 100 and the biodegradable concrete 300 and connected to the nuclear reactor pressure vessel 100; a concrete structure 400 separated from the nuclear reactor pressure vessel 100 and neighboring the biodegradable concrete 300 to support the surrounding facility 200 such as a steam generator; and a containment vessel 500 for containing the nuclear reactor pressure vessel 100, the biodegradable concrete 300, the surrounding facility 200, and the concrete structure 400.

The nuclear reactor pressure vessel 100, the biodegradable concrete 300, the surrounding facility 200, the concrete structure 400, and the containment vessel 500 included in the nuclear facility 1000 may have various known configurations.

The nuclear reactor pressure vessel 100 may be of a pressurized water reactor type, but is not limited thereto.

For example, the nuclear reactor pressure vessel 100 may be of a boiling water reactor type.

The nuclear facility 1000 may have various forms when it includes the nuclear reactor pressure vessel 100, the biodegradable concrete 300, and the concrete structure 400.

First, to decommission the nuclear facility 1000, the nuclear reactor pressure vessel 100 positioned in the containment vessel 500 is separated from the biodegradable concrete 300.

A pipe connected to the nuclear reactor pressure vessel 100 may be cut before the nuclear reactor pressure vessel 100 is separated from the biodegradable concrete 300.

The surrounding facility 200 such as a steam generator positioned in the containment vessel 500 is separated from the concrete structure 400.

A pipe connected to the surrounding facility 200 may be cut before the surrounding facility 200 is separated from the concrete structure 400.

To respectively separate the nuclear reactor pressure vessel 100 and the surrounding facility 200 from the biodegradable concrete 300 and the concrete structure 400, respective parts of the biodegradable concrete 300 and the concrete structure 400 may be cut.

Referring to FIG. 3 to FIG. 6, the concrete structure 400 is decommissioned (S200).

Figure 3:
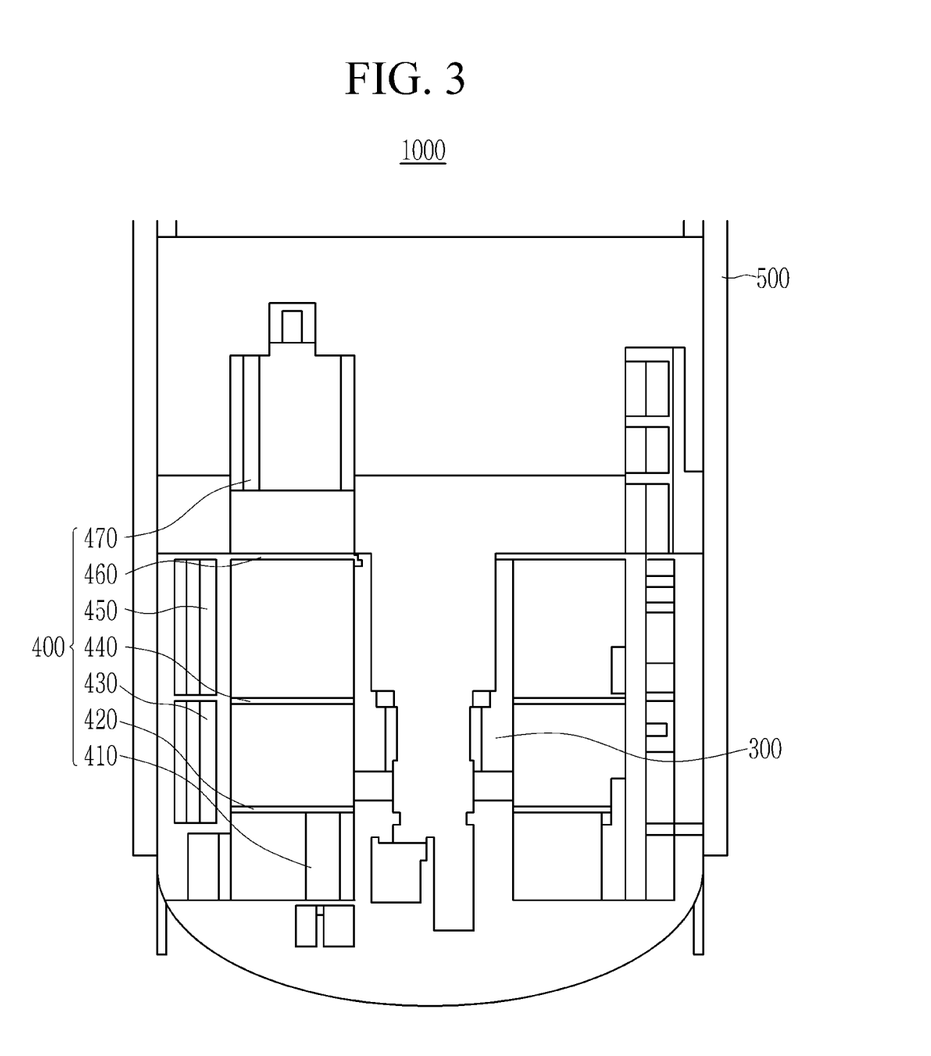

In detail, referring to FIG. 3, the concrete structure 400 positioned in the containment vessel 500 and neighboring the biodegradable concrete 300 includes a first concrete layer 410, a first floor 420, a second concrete layer 430, a second floor 440, a third concrete layer 450, a third floor 460, and a fourth concrete layer 470 sequentially stacked from a bottom of the containment vessel 500.

The concrete structure 400 is decommissioned in the containment vessel 500. The concrete structure 400 may be decommissioned by using a concrete cutting means such as a wire saw.

The fourth concrete layer 470 around the biodegradable concrete 300 is decontaminated and decommissioned.

Figure 4:
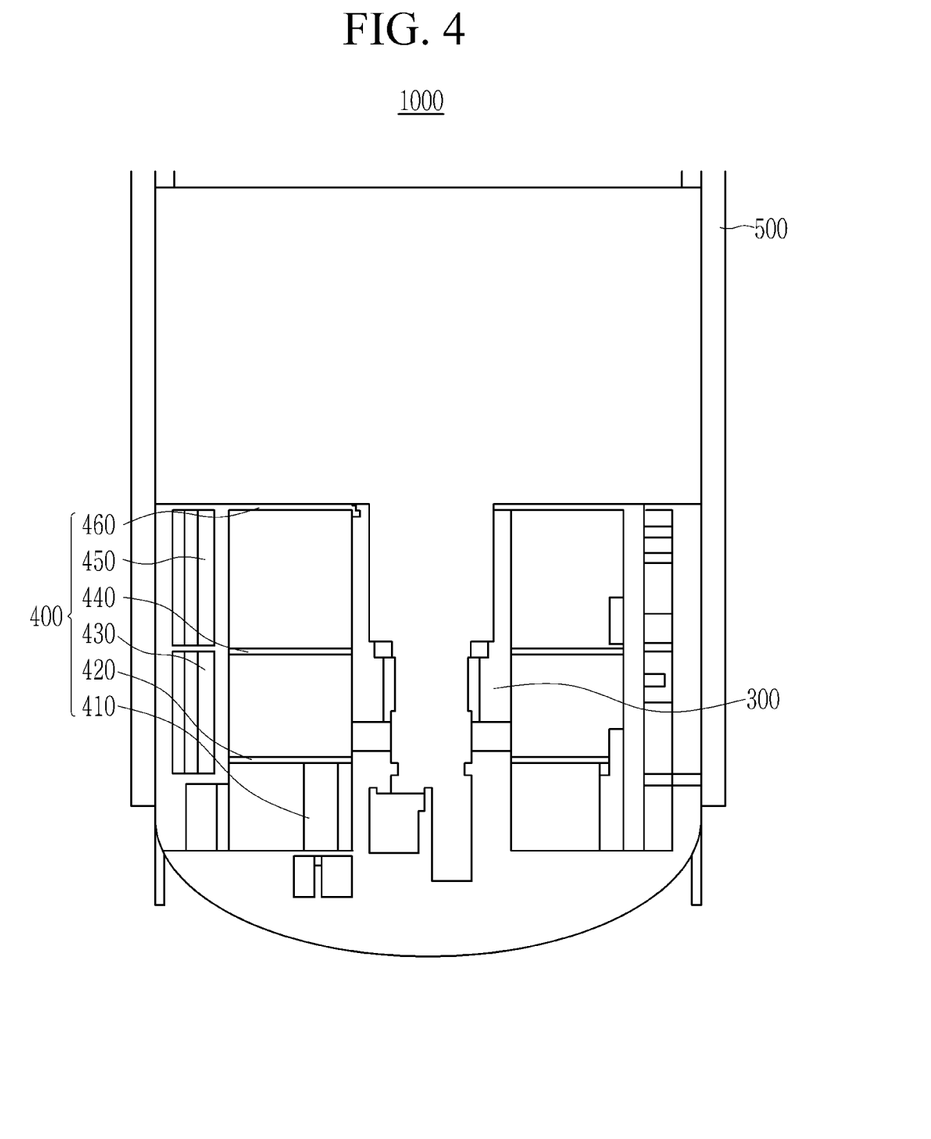

Referring to FIG. 4, the third floor 460 and the third concrete layer 450 positioned around the biodegradable concrete 300 are decontaminated and decommissioned.

Figure 5:
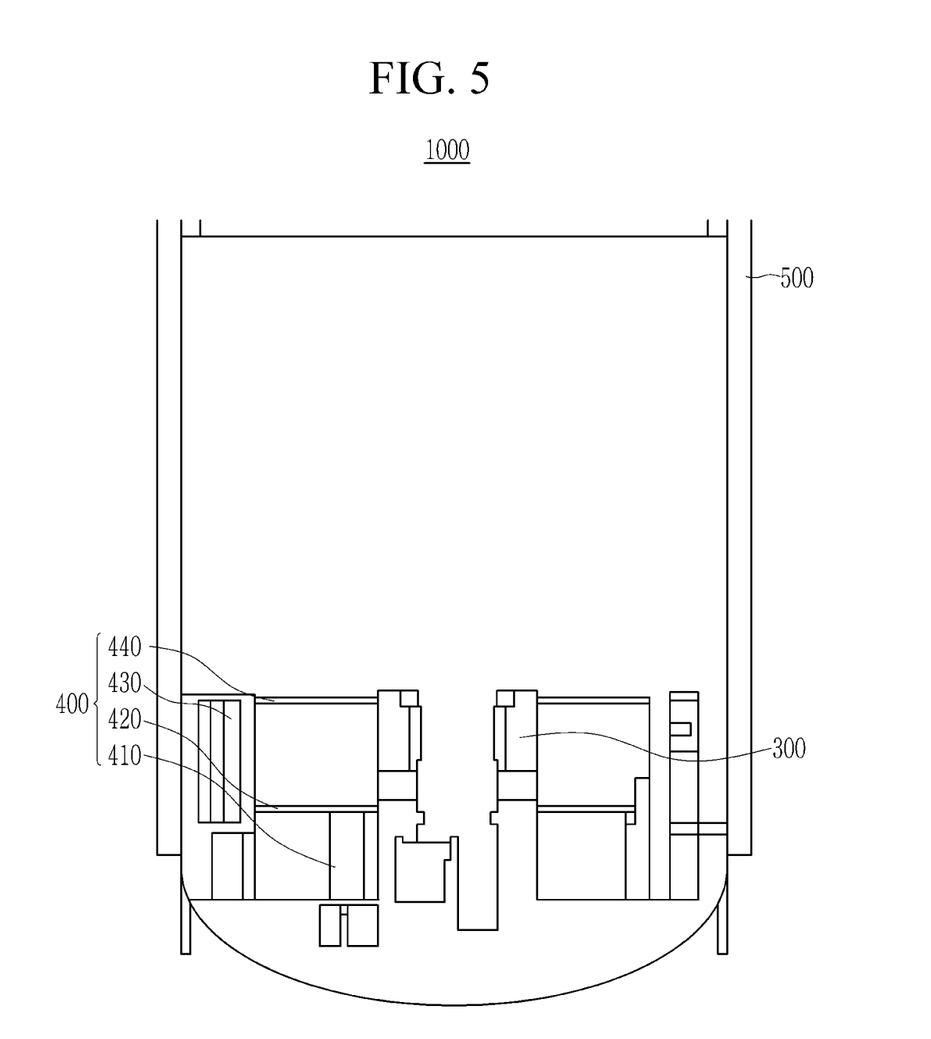

Referring to FIG. 5, the second floor 440 and the second concrete layer 430 positioned around the biodegradable concrete 300 are decontaminated and decommissioned.

Figure 6:
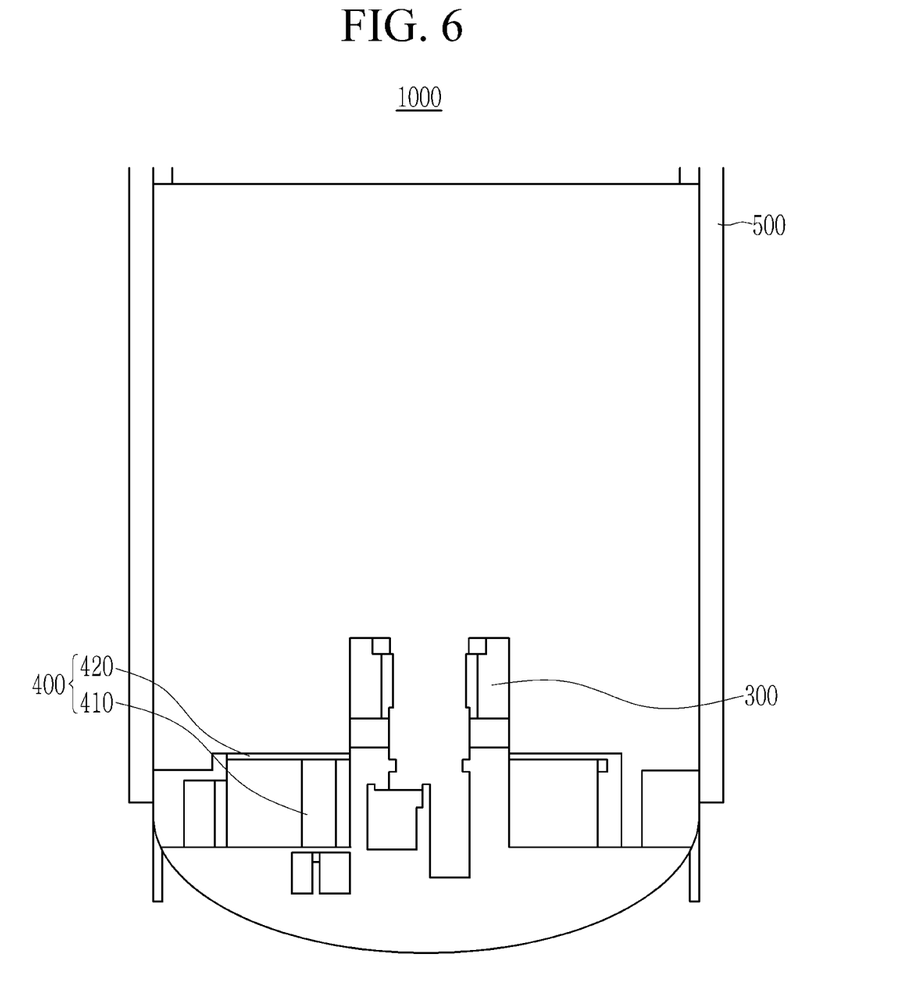

Referring to FIG. 6, the first floor 420 and the first concrete layer 410 positioned around the biodegradable concrete 300 are decontaminated and decommissioned.

As described above, when the concrete structure 400 is decommissioned, the biodegradable concrete 300 that is a highly radioactive area remains, and the concrete structure 400 positioned around the biodegradable concrete 300 is decommissioned, so contamination of the concrete structure 400 caused by decommissioning of the biodegradable concrete 300 is prevented.

That is, when the concrete structure 400 and the biodegradable concrete 300 in the containment vessel 500 are decommissioned, the concrete structure 400 that is a lowly radioactive area is first decommissioned, so contamination of other structures caused by dust spreading generated when the biodegradable concrete 300 that is a highly radioactive area is decommissioned is prevented.

Further, when the concrete structure 400 is decommissioned, the first concrete layer 410, the first floor 420, the second concrete layer 430, the second floor 440, the third concrete layer 450, the third floor 460, and the fourth concrete layer 470 included in the concrete structure 400 are decommissioned in order from the highest layer to the lowest layer while the biodegradable concrete 300 functions as a column, so there is no need to install an additional safety reinforcing structure, and a time for decommissioning the nuclear facility 1000 is minimized.

Figure 7:
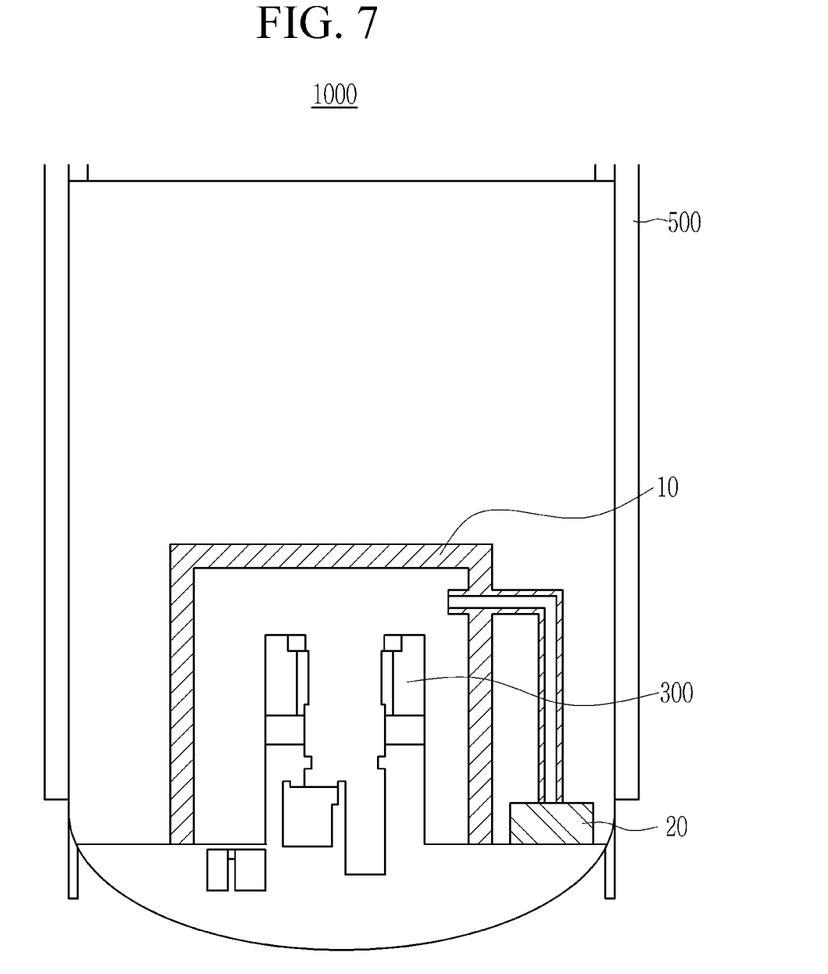

Referring to FIG. 7, the biodegradable concrete 300 is covered (S300).

In detail, the biodegradable concrete 300 positioned in the containment vessel 500 is closed and sealed with a packing container 10. The packing container 10 may include various known materials when it may close and seal the biodegradable concrete 300. The packing container 10 is connected to a suction unit 20 including a pump.

The biodegradable concrete 300 is decommissioned (S400).

In detail, the biodegradable concrete 300 is decontaminated and decommissioned while internal air in the packing container 10 is suctioned by using the suction unit 20.

The biodegradable concrete 300 is decommissioned in the packing container 10 positioned in the containment vessel 500.

The biodegradable concrete 300 may be decommissioned by using a concrete cutting means such as a wire saw.

The biodegradable concrete 300 is decommissioned while the biodegradable concrete 300 is closed and sealed by the packing container 10 and the internal air from the packing container 10 is suctioned, so the contamination of the inside of the containment vessel 500 caused by dust spreading generated when the biodegradable concrete 300 that is a highly radioactive area is decommissioned is prevented.

As described above, the method for decommissioning a nuclear facility according to an exemplary embodiment leaves the biodegradable concrete 300 that is a highly radioactive area and decommissions the concrete structure 400 positioned around the biodegradable concrete 300 when the concrete structure 400 positioned in the containment vessel 500 is decommissioned, thereby preventing contamination of the concrete structure 400 and contamination of the inside of the containment vessel 500 caused by a dust spreading according to decommissioning of the biodegradable concrete 300.

In addition, the method for decommissioning a nuclear facility according to an exemplary embodiment decommissions the concrete structure 400 around the biodegradable concrete 300 when the biodegradable concrete 300 positioned in the containment vessel 500 is decommissioned, closes and seals the biodegradable concrete 300 with the packing container 10, and decommissions the biodegradable concrete 300 while suctioning the internal air in the packing container 10, thereby contamination of the inside of the containment vessel 500 caused by dust spreading generated when the biodegradable concrete 300 that is a highly radioactive area is decommissioned.

That is, the method for decommissioning a nuclear facility for suppressing contamination of a peripheral area when the biodegradable concrete 300 is decommissioned is provided.

Further, the method for decommissioning a nuclear facility according to an exemplary embodiment decommissions the concrete structure 400 in order from the highest layer to the lowest layer while the biodegradable concrete 300 that is not decommissioned functions as a column, when the concrete structure 400 is decommissioned, so there is no need to install an additional safety reinforcing structure, and a time for decommissioning the nuclear facility 1000 is minimized.

That is, the method for decommissioning a nuclear facility with a minimized time for decommissioning the nuclear facility 1000 is provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for decommissioning a nuclear facility including a nuclear reactor pressure vessel, biodegradable concrete surrounding the nuclear reactor pressure vessel, and a concrete structure separated from the nuclear reactor pressure vessel and neighboring the biodegradable concrete, comprising:
  separating the nuclear reactor pressure vessel from the biodegradable concrete;
  decommissioning the concrete structure;
  covering the biodegradable concrete; and
  decommissioning the biodegradable concrete,
  wherein the nuclear facility further includes a containment vessel for containing the nuclear reactor pressure vessel, the biodegradable concrete, and the concrete structure, and the concrete structure is decommissioned and the biodegradable concrete is decommissioned in the containment vessel,
  wherein the covering of the biodegradable concrete is performed by closing and sealing the biodegradable concrete with a packing container, and
  wherein the decommissioning of the biodegradable concrete is performed by suctioning internal air from the packing container using a suction unit installed within the containment vessel and connected to the packing container.

2. The method of claim 1, wherein
the nuclear reactor pressure vessel is of a pressurized water reactor type.

3. The method of claim 1, wherein
the concrete structure includes a first concrete layer, a first floor, a second concrete layer, a second floor, a third concrete layer, a third floor, and a fourth concrete layer that are sequentially stacked.

4. The method of claim 3, wherein
the decommissioning of the concrete structure includes:
decommissioning the fourth concrete layer;
decommissioning the third floor and the third concrete layer;
decommissioning the second floor and the second concrete layer; and
decommissioning the first floor and the first concrete layer.

* * * * *